(12) United States Patent
Naito et al.

(10) Patent No.: US 7,342,767 B2
(45) Date of Patent: Mar. 11, 2008

(54) MULTILAYER CERAMIC CAPACITOR AND METHOD FOR MANUFACTURING THE SAME

(75) Inventors: Masahiro Naito, Kyoto-fu (JP); Noriyuki Inoue, Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/517,515

(22) Filed: Sep. 8, 2006

(65) Prior Publication Data
US 2007/0009719 A1 Jan. 11, 2007

Related U.S. Application Data

(63) Continuation of application No. PCT/JP2006/301635, filed on Feb. 1, 2006.

(30) Foreign Application Priority Data
Feb. 4, 2005 (JP) ............................. 2005-029119

(51) Int. Cl.
 *H01G 4/06* (2006.01)
 *H01G 7/00* (2006.01)
(52) U.S. Cl. .................... 361/321.2; 361/311; 29/25.42
(58) Field of Classification Search ................ 361/311, 361/303, 321.1, 321.2, 321.3, 321.4, 321.5
See application file for complete search history.

(56) References Cited

U.S. PATENT DOCUMENTS 6,487,065 B1 * 11/2002 Nishino et al. .......... 361/321.2
2002/0080555 A1 * 6/2002 Nishiyama et al. ......... 361/302

FOREIGN PATENT DOCUMENTS

| JP | 05-217426 | 8/1993 |
| JP | 11-283860 | 10/1999 |
| JP | 2002-265261 | 9/2002 |
| JP | 2002-356371 | 12/2002 |
| JP | 2004-039892 | 2/2004 |
| JP | 2004-214539 | 7/2004 |

OTHER PUBLICATIONS

Written Opinion of the International Searching Authority dated May 16, 2006.

* cited by examiner

*Primary Examiner*—Eric Thomas
(74) *Attorney, Agent, or Firm*—Dickstein, Shapiro, LLP.

(57) ABSTRACT

A ceramic base body includes primary phase particles containing a $CaZrO_3$-based compound as a primary component and secondary phase particles containing at least Mn, and internal electrodes are primarily composed of Cu. There are about 2 parts by mole or more of Mn and about 0.69 parts by mole or more of Si pph by mole of primary component, are contained in the ceramic base body, and the area ratio of the secondary phase particles on a cross-section of the ceramic base body is about 0.1% or more. Of those secondary phase particles having a particle diameter of about 0.1 μm or more, about 67% or more (preferably about 85% or more) contains Cu and Si. A multilayer ceramic capacitor containing the ceramic base body can be manufactured by performing a heat treatment at a temperature of about 700° C. or more in a reducing atmosphere at an oxygen partial pressure of about $10^{-8.5}$ MPa or less after the formation of external electrodes. As a result, a highly reliable multilayer ceramic capacitor can be realized in which the temperature properties of electrostatic capacitance are superior, a high Q value is obtained, and the degradation in high-temperature load lifetime can be suppressed.

19 Claims, 1 Drawing Sheet

MULTILAYER CERAMIC CAPACITOR AND METHOD FOR MANUFACTURING THE SAME

This is a continuation of application Ser. No. PCT/JP2006/301635, filed Feb. 1, 2006.

TECHNICAL FIELD

The present invention relates to a multilayer ceramic capacitor and a method for manufacturing the same, and more particularly, relates to a multilayer ceramic capacitor including a $CaZrO_3$-based compound as a primary component and additives such as Mn and to a method for manufacturing the multilayer ceramic capacitor.

BACKGROUND ART

A $CaZrO_3$-based compound has been widely used for temperature-compensating capacitors because it has a small temperature coefficient of electrostatic capacitance and a small dielectric loss, i.e., small tan δ.

In general, this type of multilayer ceramic capacitor is manufactured by the steps of laminating ceramic green sheets provided with conductive patterns thereon to form a ceramic laminate, performing a firing treatment for this ceramic laminate to form a ceramic base body having internal electrodes embedded therein, then applying a conductive paste on two end portions of the ceramic base body, performing a baking treatment to form external electrodes, and forming plating films of Ni, Sn, and the like on the surfaces of the external electrodes.

In addition, a multilayer ceramic capacitor has been proposed heretofore (in Patent Document 1) having a structure in which the ceramic layer (ceramic base body) is composed of a ceramic material containing a composite oxide represented by $(CaO)_x(Zr_{1-y}Ti_y)O_2$, 1.0 to 3.0 parts by weight of an Mn compound in the form of $MnCO_3$ and 0.5 to 2.0 parts by weight of a $Li_2O$—$B_2O_3$—$CaO$-based glass component, each amount being relative to 100 parts by weight of the composite oxide, and in which internal electrodes are formed from a Cu-based conductive material.

According to this Patent Document 1, besides the $CaZrO_3$-based composite oxide used as a primary component, the ceramic layer contains the Mn compound and the $Li_2O$—$B_2O_3$—$CaO$-based glass component as auxiliary components, and in addition, the internal electrodes are formed from inexpensive Cu having superior electrical conductivity; hence, a low-temperature firable multilayer ceramic capacitor can be obtained in which the temperature coefficient of electrostatic capacitance satisfies the CG characteristic (within ±30 ppm/° C. relative to an electrostatic capacitance at 25° C. in a temperature range of −55 to 125° C.), and in which a high Q value (=1/tan δ), such as 10,000 or more, and a relative dielectric constant of 28 to 32 are achieved.

Patent Document 1: Japanese Unexamined Patent Application Publication No. 11-283860

DISCLOSURE OF INVENTION

Problems to be Solved by the Invention

However, since Cu is used as an internal electrode material according to Patent Document 1, and the Mn compound is contained in the ceramic material, the Cu for forming the internal electrodes partly diffuses to the ceramic layer during the firing treatment and precipitates a segregated material made of Mn—Cu—O; hence, various properties of the multilayer ceramic capacitor are adversely influenced, and in particular, there has been a problem in that the high-temperature load lifetime is degraded.

In consideration of the situation described above, the present invention was made, and an object of the present invention is to provide a highly reliable multilayer ceramic capacitor in which the temperature properties of electrostatic capacitance is superior, the Q value is high, and high-temperature load lifetime degradation is suppressed, and is to provide a method for manufacturing the above multilayer ceramic capacitor.

Means for Solving the Problems

Through intensive research carried out by the inventors of the present invention in order to achieve the above object, it was found that in a multilayer ceramic capacitor including a $CaZrO_3$-based compound as a primary component, that when Mn and Si are contained in a ceramic base body so that the area ratio of secondary phase particles containing Mn is about 0.1% or more on a cross-section of the ceramic base body and so that about 67% or more of the secondary phase particles having a particle diameter of about 0.1 μm or more contain Si and Cu, a multilayer ceramic capacitor can be obtained which has superior temperature properties of electrostatic capacitance and a high Q value, and which can suppress high-temperature load lifetime degradation. Preferably the area ratio is less than about 20%.

The present invention was made based on the findings as described above, and a multilayer ceramic capacitor according to the present invention comprises: a ceramic base body including primary phase particles containing a $CaZrO_3$-based compound as a primary component and secondary phase particles containing at least Mn; internal electrodes which are primarily composed of Cu and which are embedded in the ceramic base body; and external electrodes which are formed at end portions of the ceramic base body and which are connected to one end of selected internal electrodes. In the multilayer ceramic capacitor described above, about 2 parts by mole or more of Mn and about 0.69 parts by mole or more of Si are contained in the ceramic base body relative to 100 parts by mole of the primary component, the area ratio of the secondary phase particles on a cross-section of the ceramic base body is about 0.1% or more, and 67% or more of the secondary particles having a particle diameter of about 0.1 μm or more contain Cu and Si.

Furthermore, about 85% or more of the secondary phase particles having a particle diameter of 0.1 μm or more in the multilayer ceramic capacitor of the present invention preferably contains Cu and Si.

According to research results obtained by the inventors of the present invention, it is also understood that in the $CaZrO_3$-based compound used as a primary component, the predetermined function and advantage can be obtained even when Ca is partly replaced with Sr and/or Ba, and Zr is partly replaced with Ti.

That is, Ca may be partly replaced with Sr and/or Ba, and Zr may be partly replaced with Ti in the $CaZrO_3$-based compound, according to the multilayer ceramic capacitor of the present invention.

The $CaZrO_3$-based compound is preferably a composite oxide represented by a general formula: $(Ca_{1-a-b}Sr_aBa_b)_m(Zr_{1-c}Ti_c)O_3$ where $0 \leq a \leq 0.45$, $0 \leq b \leq 0.10$, $0 \leq c \leq 0.10$, and $0.98 \leq m \leq 1.02$.

According to the multilayer ceramic capacitor of the present invention, the ceramic base body may furthermore, contain at least one component containing consisting of Mg, Ca, Sr, Ba, Li, B, Al and Ti.

In addition, the multilayer ceramic capacitor described above can be manufactured by performing a heat treatment at a temperature of 700° C. or more in a reducing atmosphere at an oxygen partial pressure of $10^{-8.5}$ MPa or less.

That is, a method for manufacturing a multilayer ceramic capacitor according to the present invention comprises the steps of: adding as an auxiliary component, compound(s) which contains at least Mn and Si, to a primary component of a $CaZrO_3$-based compound so that the amounts of Mn and Si are about 2 parts by mole or more and about 0.69 parts by mole or more, respectively, relative to 100 parts by mole of the primary component to form ceramic green sheets; applying an internal-electrode conductive paste primarily composed of Cu to surfaces of the ceramic green sheets to form conductive patterns; laminating a plurality of the ceramic green sheets provided with the conductive patterns to form a ceramic laminate; performing a firing treatment to form a ceramic base body; applying an external-electrode conductive paste to end portions of the ceramic base body, followed by baking; and then performing a heat treatment at a temperature of 700° C. or more in a reducing atmosphere at an oxygen partial pressure of $10^{-8.5}$ MPa or less.

In addition, a method for manufacturing a multilayer ceramic capacitor according to the present invention comprises the steps of: adding as an auxiliary component, compound(s) which contains at least Mn and Si to a primary component of a $CaZrO_3$-based compound so that the amounts of Mn and Si are about 2 parts by mole or more and about 0.69 parts by mole or more, respectively, relative to 100 parts by mole of the primary component to form ceramic green sheets; applying an internal-electrode conductive paste primarily composed of Cu to surfaces of the ceramic green sheets to form conductive patterns; laminating a plurality of the ceramic green sheets provided with the conductive patterns to form a ceramic laminate; applying an external-electrode conductive paste to end portions of the ceramic base body, followed by firing; and then performing a heat treatment at a temperature of 700° C. or more in a reducing atmosphere at an oxygen partial pressure of $10^{-8.5}$ MPa or less.

Advantages

According to the multilayer ceramic capacitor of the present invention, about 2 parts by mole or more of Mn and about 0.69 parts by mole or more of Si are contained in the ceramic base body relative to 100 parts by mole of the primary component, the area ratio of the secondary phase particles on a cross-section of the ceramic base body is about 0.1% or more, and about 67% or more of the secondary phase particles having a particle diameter of 0.1 μm or more contain Cu and Si; hence, even when Cu for forming the internal electrodes partly diffuses to the ceramic layer during firing, Mn and Cu are absorbed in a Si-containing phase. Hence, the amount of a segregated material of Mn—Cu—O, which has been believed to adversely influence various properties of a multilayer ceramic capacitor, is decreased, and as a result, a multilayer ceramic capacitor can be obtained in which superior temperature properties of electrostatic capacitance, a high Q value, and suppression of degradation in high-temperature load lifetime can be achieved.

In particular, a highly reliable multilayer ceramic capacitor can be obtained in which the temperature coefficient of electrostatic capacitance satisfies the CG characteristic, the Q value is 10,000 or more, and the degradation in insulating resistance (log IR) obtained after a high-temperature load test relative to the initial insulating resistance (log $IR_0$) can be suppressed to three orders of magnitude or less.

In addition, when the $CaZrO_3$-based compound forming the ceramic base body is composed of a composite oxide represented by a general formula: $(Ca_{1-a-b}Sr_aBa_b)_m(Zr_{1-c}Ti_c)O_3$ where $0 \leq a \leq 0.45$, $0 \leq b \leq 0.10$, $0 \leq c \leq 0.10$, and $0.98 \leq m \leq 1.02$, and when the above auxiliary component further contains at least one of Mg, Ca, Sr, Ba, Li, B, Al and Ti, the above function and advantage can be reliably obtained.

According to the method for manufacturing a multilayer ceramic capacitor of the present invention, since the heat treatment is performed at a temperature of about 700° C. or more in a reducing atmosphere at an oxygen partial pressure of about $10^{-8.5}$ MPa or less after the external electrodes are formed by baking, about 67% or more of the secondary phase particles having a particle diameter of about 0.1 μm or more contain Si and Cu, and as described above, a multilayer ceramic capacitor can be easily manufactured in which the temperature properties of electrostatic capacitance is superior, the Q value is high, and the high-temperature load lifetime is superior.

For the formation of the external electrodes, there have been (1) a method having the steps of performing a firing treatment for a ceramic laminate, then applying an external-electrode conductive paste, and performing a baking treatment, and (2) a method having the steps of applying an external-electrode conductive paste to a ceramic laminate, and then performing a firing treatment so that the baking treatment is performed which also functions as the firing treatment for the ceramic laminate. When a heat treatment is performed at a temperature of about 700° C. or more in a reducing atmosphere at an oxygen partial pressure of about $10^{-8.5}$ MPa or less after the formation of the external electrodes in both cases described above, it is possible to enable about 67% or more of the secondary phase particles having a particle diameter of about 0.1 μm or more to contain Cu and Si.

Figure 1:
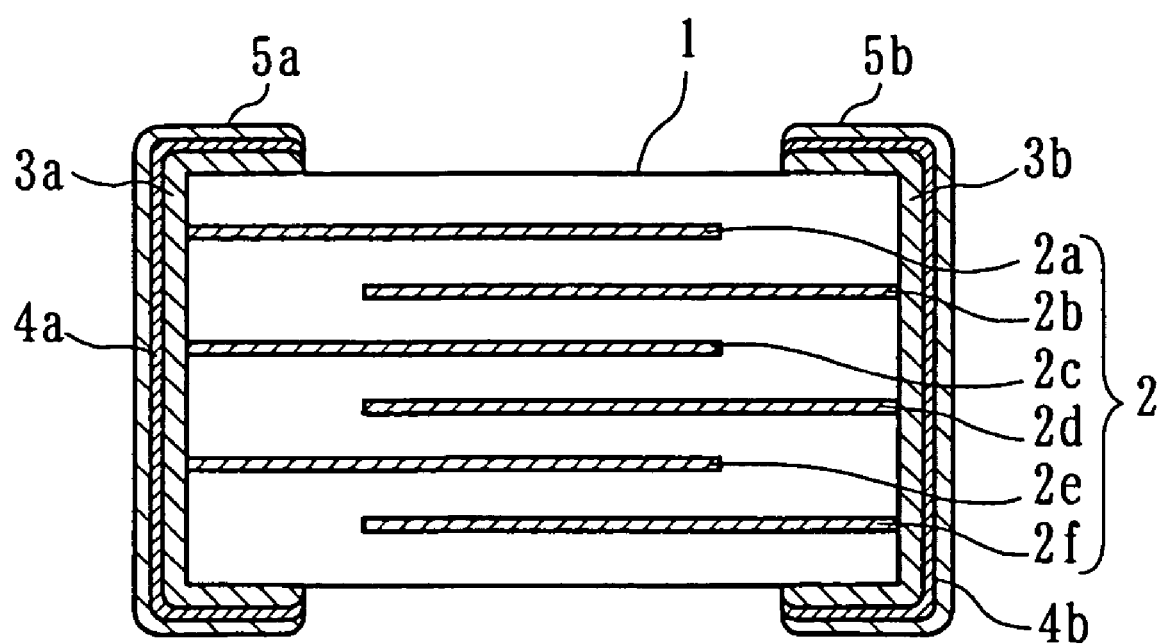
FIG. 1 is a cross-sectional view schematically showing one embodiment of a multilayer ceramic capacitor according to the present invention.

REFERENCE NUMERALS 1 ceramic base body
2 internal electrode
3a external electrode
3b external electrode

BEST MODE FOR CARRYING OUT THE INVENTION

Next, an embodiment of the present invention will be described in detail.

FIG. 1 is a cross-sectional view schematically showing one embodiment of a multilayer ceramic capacitor according to the present invention.

In the multilayer ceramic capacitor, internal electrodes 2 (2a to 2f) primarily formed of Cu are embedded in a ceramic base body 1 made from a sintered ceramic material, external electrodes 3a and 3b are formed on two end portions of the ceramic base body 1, and in addition, on the surfaces of the external electrodes 3a and 3b, first plating films 4a and 4b and second plating films 5a and 5b are formed.

In particular, the internal electrodes 2a to 2f are provided in parallel in the lamination direction so that the internal electrodes 2a, 2c, and 2e and internal electrodes 2b, 2d, and 2f are electrically connected to the external electrodes 3a and 3b, respectively. In addition, electrostatic capacitances are formed between opposite faces of the internal electrodes 2a, 2c, and 2e and the internal electrodes 2b, 2d, and 2f.

The ceramic base body 1 includes primary phase particles containing the $CaZrO_3$-based compound as a primary component and secondary phase particles containing at least Mn; about 2 parts by mole or more of Mn and about 0.69 parts by mole or more of Si are contained in the ceramic base body 1 relative to 100 parts by mole of the primary component; the area ratio of the secondary phase particles on a cross-section of the ceramic base body 1 is about 0.1% or more; and about 67% or more of the secondary phase particles having a particle diameter of about 0.1 μm or more contain Cu and Si.

When the ceramic base body 1 is formed so that about 67% or more of the secondary phase particles having a particle diameter of about 0.1 μm or more contain Si and Cu, the temperature coefficient of electrostatic capacitance satisfies the CG characteristic, a Q value of 10,000 or more can be ensured, and the degradation in insulating resistance (log IR) obtained after a high-temperature load test relative to the initial insulating resistance (log $IR_0$) can be suppressed to three orders of magnitude or less. As a result, a highly reliable multilayer ceramic capacitor can be obtained in which the temperature properties of electrostatic capacitance are superior, the dielectric loss is low, and the degradation in high-temperature load lifetime can be suppressed; hence, particularly, a temperature-compensating multilayer ceramic capacitor is suitably formed.

As described later, the ceramic base body 1 is generally formed by performing a firing treatment to form a ceramic laminate composed of ceramic green sheets laminated to each other which are provided with conductive patterns primarily composed of Cu. Since the Cu used for forming the internal electrodes partly diffuses into the ceramic layer during the firing treatment, the ceramic layer is mixed with Cu and a segregated material of Mn—Cu—O is precipitated as secondary phase particles between the primary phase particles such that the segregated material thus formed causes adverse influence on various properties of the multilayer ceramic capacitor. Research by the inventors of the present invention found that when the Mn—Cu—O is absorbed in a Si-containing phase, and about 67% or more of particles having a the secondary phase particle diameter of about 0.1 μm or more contain Si and Cu, the amount of the Mn—Cu—O can be decreased.

That is, when the number of secondary phase particles containing Si and Cu is less than about 67% of particles having a particle diameter of about 0.1 μm or more, the decrease in Q value and/or the degradation in high-temperature load lifetime may occur; however, when the number of particles containing Si and Cu is set to about 67% or more and more preferably about 85% or more, a desired high Q value can be obtained and the degradation in high-temperature load lifetime can be suppressed.

When about 67% or more of the secondary phase particles having a particle diameter of about 0.1 μm or more contain Si and Cu, as described above, a multilayer ceramic capacitor can be obtained in which the temperature coefficient of electrostatic capacitance satisfies the CG characteristic, a desired high Q value can be obtained, and the degradation in high-temperature load lifetime can be suppressed.

In this embodiment, the area ratio of the secondary phase particles on a cross-section of the ceramic base body 1 is an addition set to about 0.1% or more, and the reason for this is that when the area ratio is less than about 0.1%, the high-temperature load lifetime is degraded, so that the reliability may be degraded. In order to ensure the above area ratio, about 2 parts by mole or more of Mn and about 0.69 parts by mole or more of Si must be contained in the ceramic base body 1 relative to 100 parts by mole of the primary component. In other words, the contents of Mn and Si relative to 100 parts by mole of the primary component are set to about 2 parts by mole or more and about 0.69 parts by mole or more, respectively, in order to ensure an area ratio of about 0.1% or more.

Other elements may be contained in Mn—Cu—Si—O, as long as the object of the present invention is not interfered with.

With respect to the $CaZrO_3$-based compound forming the primary component of the primary phase particles, besides $CaZrO_3$, a compound in which Ca is partly replaced with Sr and/or Ba, or a compound in which Zr is partly replaced with Ti may also be used.

Accordingly, a composite oxide represented by the following general formula [A] may also be used as the $CaZrO_3$-based compound:

$$(Ca_{1-a-b}Sr_aBa_b)_m(Zr_{1-c}Ti_c)O_3 \qquad [A]$$

In addition, the inventors of the present invention confirmed that when a, b, c, and m satisfy $0 \leq a \leq 0.45$, $0 \leq b \leq 0.10$, $0 \leq c \leq 0.10$, and $0.98 \leq m \leq 1.02$, respectively, the predetermined function and advantage can be obtained.

As an auxiliary component of the ceramic base body 1, compounds preferable containing at least one of Mg, Ca, Sr, Ba, Li, B, Al and Ti can be used. In this case, these addition components may be present in the form of a solid solution in the primary phase particles or secondary phase particles or may be present in the form of oxides in crystal grain boundaries. Alternatively, these components may be present in the form of a single oxide such as BaO or in the form of a composite oxide. Furthermore, the addition components may be present in an amorphous state together with Si and the like.

As an external electrode material, any material may be used without any particular limitation as long as it has superior electrical conductivity; however, in consideration of price and the like, a base metal material such as Cu, Ni or a Cu—Ni alloy is preferably used.

Next, a method for manufacturing the above multilayer ceramic capacitor will be described in detail.

As ceramic raw materials (hereinafter referred to as "primary component raw materials") for forming the primary component, predetermined amounts of $CaCO_3$, $ZrO_2$ and $TiO_2$, and whenever necessary, predetermined amounts of $SrCO_3$ and $BaCO_3$ are weighed, and these primary component raw materials are charged in a ball mill where they are then mixed and pulverized in a wet state. Subsequently, after drying, a calcination treatment is performed at a predetermined temperature (such as 800 to 1,300° C.) for approximately 2 hours in ambient atmosphere, so that a calcined material is obtained.

Next, as the auxiliary component, predetermined amounts of at least MnO and $SiO_2$ and, whenever necessary, predetermined amounts of MgO, CaO, SrO, BaO, $Li_2O$, $B_2O_3$, $Al_2O_3$, and $TiO_2$ are weighed and charged in a ball mill to be mixed with the calcined material. Subsequently, pulverization in a wet state is performed, followed by drying, so that a ceramic raw material powder is obtained. Materials other than carbonates and oxides may also be used as the ceramic raw materials for the primary and the auxiliary components, as long as they are changed into oxides during the heating.

Next, after a binder and an organic solvent are added to this ceramic raw material powder and wet-mixed in a ball mill to form a ceramic slurry, the ceramic slurry is molded using a molding method such as a doctor blade method, and the molded sheet is cut so as to have predetermined dimensions, thereby forming for instance rectangular ceramic green sheets.

Then, an internal-electrode conductive paste primarily composed of Cu is applied to the ceramic green sheets using a screen printing method or the like, so that conductive patterns are formed.

The ceramic green sheets provided with the conductive patterns are laminated in a predetermined direction, and ceramic green sheets provided with no conductive patterns are disposed to sandwich the above laminated ceramic green sheets, followed by pressure bonding, so that a ceramic laminate is formed.

Subsequently, the ceramic laminate is heated to a predetermined temperature in ambient atmosphere, a nitrogen atmosphere, a $N_2$—$H_2$ atmosphere or a $N_2$—$H_2$—$H_2O$ atmosphere so as to expel the binder, and a firing treatment is further performed at 850 to 1,000° C. in a reducing atmosphere at an oxygen partial pressure of about $10^{-8.5}$ MPa or less, so that a ceramic base body 1 is obtained having the internal electrodes 2 embedded therein.

After this ceramic base body 1 is processed by barrel polishing so as to expose the internal electrodes at the end surfaces of the ceramic base body 1, an external-electrode conductive paste is applied to the end portions of the ceramic base body 1, followed by drying. A baking treatment is then performed in a reducing atmosphere at an oxygen partial pressure of about $10^{-8.5}$ MPa or less using a firing profile having a maximum temperature of about 700° C. or more, thereby forming the external electrodes 3a and 3b.

The reason the baking treatment is performed using obtain a firing profile having a maximum temperature of about 700° C. or more is that when the maximum temperature of the baking treatment is less than about 700° C., the external electrodes 3a and 3b cannot be sufficiently sintered, and thereby the dielectric loss, tan δ, is increased. In addition, since the melting point of Cu is 1,083° C., the upper limit of the baking treatment temperature is preferably set to about 1,000° C. or less.

Next, a heat treatment is performed so as to obtain a firing profile having a maximum temperature of about 700° C. or more in a reducing atmosphere at an oxygen partial pressure of about $10^{-8.5}$ MPa or less.

The reason the oxygen partial pressure in the heat treatment is set to about $10^{-8.5}$ MPa or less is that when the oxygen partial pressure is more than about $10^{-8.5}$ MPa, Mn present in a Si-containing phase cannot be sufficiently absorbed therein, and as a result, the temperature coefficient of electrostatic capacitance does not satisfy the CG characteristic; the Q value is also decreased, so that the dielectric loss, tan δ, is increased; and in addition, the high-temperature load lifetime is degraded, so that the predetermined object cannot be achieved. The lower limit of the oxygen partial pressure is not particularly limited; however, a lower limit of about $10^{-21.0}$ MPa or more is practically preferable.

The reason that the maximum temperature during the heat treatment is set to about 700° C. or more is that when the maximum temperature is less than about 700° C., Mn—Cu—O present in the vicinity of the interface with the internal electrode cannot be sufficiently absorbed in a Si-containing phase, and as a result, the temperature coefficient of electrostatic capacitance does not satisfy the CG characteristic; the Q value is also decreased, so that the dielectric loss, tan δ, is increased; and in addition, the high-temperature load lifetime is degraded, so that the predetermined object cannot be achieved. The upper limit of the maximum temperature during the heat treatment is not also particularly limited; however, in consideration of a melting point of Cu of 1,083° C., the upper limit is preferably set to about 1,000° C. or less.

Subsequently, the first plating films 4a and 4b made from Ni, Cu, or the like are formed on the surfaces of the external electrodes 3a and 3b by electrolytic plating, and the second plating films 5a and 5b made from Sn, solder, or the like are formed on the surfaces of the first plating films 4a and 4b, so that the multilayer ceramic capacitor is manufactured.

In the multilayer ceramic capacitor manufactured as described above, since about 67% or more of the secondary phase particles having a particle diameter of about 0.1 μm or more containing Mn also contains Si and Cu, a highly reliable multilayer ceramic capacitor can be realized which has superior temperature properties of electrostatic capacitance, a high Q value, and an improved high-temperature load lifetime.

In this embodiment, the heat treatments from the firing treatment of the ceramic laminate to the heat treatment as the final step via the baking treatment for the external electrode formation can be performed under the conditions in conformity with those of the heat treatment, and hence these successive treatments can be performed in accordance with the same firing profile in the same reducing atmosphere, and as a result, the manufacturing process can be prevented from being complicated. However, the present invention is not limited to the above embodiment.

In the above embodiment, the external electrodes are formed by the baking treatment after a firing treatment is performed for the ceramic laminate; however, after the external-electrode conductive paste is applied to the end portions of the ceramic laminate, firing may be performed so as to simultaneously perform the firing treatment of the ceramic laminate and the baking treatment for the external electrodes.

In addition, although heat treatments from the firing treatment of the ceramic laminate to the heat treatment as the final step can be performed by the same firing profile in the above embodiment, the individual treatment steps may be performed under different conditions; for example, the baking treatment may be performed in ambient atmosphere, and the subsequent heat treatment may be performed in the above-described reducing atmosphere.

In the above embodiment, immediately after the primary component raw materials are prepared, the auxiliary component is added; however, the composition may be adjusted by addition of the same raw materials ($CaCO_3$, $ZrO_2$, $TiO_2$, $SrCO_3$, $BaCO_3$) as those of the primary component to the secondary component raw materials.

Furthermore, although the auxiliary component in this embodiment, is directly added to the primary component raw materials, the auxiliary component may be added, after part or the whole of the auxiliary component is finely pulverized into particles having an average particle diameter of about 2 μm or less, or the auxiliary component may be added after calcination is performed following fine pulverization.

Next, examples of the present invention will be described in detail.

EXAMPLES

First, as the primary component raw materials, $CaCO_3$, $ZrO_2$, $TiO_2$, $SrCO_3$ and $BaCO_3$ each having a purity of 99% or more were prepared and were weighed so as to obtain the primary component compositions shown in Table 1.

Next, the primary component raw materials were charged in a ball mill and were then mixed and pulverized in a wet state. Subsequently, after a drying step, a calcination treatment was performed at 1,200° C. for 2 hours in ambient atmosphere so that a calcined material was obtained.

Next, for the auxiliary component, MnO, $SiO_2$, MgO, CaO, SrO, BaO, $Li_2O$, $B_2O_3$, $Al_2O_3$ and $TiO_2$ each having a purity of 99% or more were prepared and were then weighed so that the amount of the auxiliary component on a parts by mole basis relative to 100 parts by mole of the primary component was as shown in Table 1. Subsequently, the auxiliary component was charged to a ball mill to be mixed with the calcined material, and drying was performed following wet pulverization, so that a ceramic raw material powder was obtained.

Next, a poly(vinyl butyral) resin (binder) and ethanol (organic solvent) were added to this ceramic raw material powder, followed by wet mixing in a ball mill, thereby forming a ceramic slurry.

The ceramic slurry was molded by a doctor blade method and was then cut into rectangular ceramic green sheets which were to be formed into ceramic layers each having a thickness of 5 μm after firing.

Next, an internal-electrode conductive paste primarily composed of Cu was applied onto the ceramic green sheets by a screen printing method or the like, thereby forming conductive patterns.

These ceramic green sheets provided with the conductive paste were laminated in a predetermined direction, and ceramic green sheets having no conductive patterns were disposed so as to sandwich the above laminated ceramic green sheets, followed by pressure bonding, so that a ceramic laminate was formed. The number of the laminated ceramic green sheets provided with the conductive patterns was 10.

Subsequently, after this ceramic laminate was heated to 500° C. in ambient atmosphere so as to burn off the binder, a firing treatment was performed in a reducing atmosphere at an oxygen partial pressure of about $10^{-8.5}$ to $10^{-21.0}$ MPa during which the maximum temperature was about 850 to 1,000° C., and as a result, a ceramic base body (ceramic sintered body) having the internal electrodes embedded therein was obtained.

Next, the ceramic base body was processed by barrel polishing so as to expose the internal electrodes at the end surfaces of the ceramic base body, and, an external-electrode conductive paste was applied to the two end portions of the ceramic base body, followed by drying. A baking treatment was then performed in a reducing atmosphere at an oxygen partial pressure of about $10^{-8.5}$ to $10^{-21.0}$ MPa using a firing profile in which a maximum temperature of about 700° C. to 1,000° C. was obtained, and as a result, the external electrodes were formed.

Subsequently, a heat treatment was performed under the heat treatment conditions (the maximum temperature of the firing profile being 650 to 1,000° C. in a reducing atmosphere at an oxygen partial pressure of about $10^{-8.5}$ to $10^{-21.0}$ MPa) as shown in Table 1.

Next, electrolytic plating was performed using a barrel plating method so that, Ni films and Sn films were sequentially formed on the external electrodes, and multilayer ceramic capacitors of sample Nos. 1 to 26 were obtained. The external dimensions of the multilayer ceramic capacitor thus formed were 0.6 mm long, 0.3 mm wide, and 0.3 mm thick.

The Table below shows individual component constituents of the primary and the auxiliary components of samples Nos. 1 to 26, the firing temperatures during the external electrode formation, and the heat treatment conditions after the external electrode formation.

| Sample No. | Primary Component $(Ca_{1-a-b}Sr_aBa_b)_m(Zr_{1-c}Ti_c)O_3$ | | | | Auxiliary Component (parts by mole to 100 parts by mole of Primary Component) | | | | | | | | | | Baking Temperature (° C.) | Heat Treatment Conditions | |
|---|---|---|---|---|---|---|---|---|---|---|---|---|---|---|---|---|---|
| | a | b | m | c | MnO | $SiO_2$ | MgO | CaO | SrO | BaO | $LiO_{1/2}$ | $BO_{3/2}$ | $AlO_{3/2}$ | $TiO_2$ | | Temperature (° C.) | Oxygen Partial Pressure $logPO_2$ (MPa) |
| 1 | 0.02 | 0.00 | 1.00 | 0.02 | 7.84 | 8.68 | 0.00 | 14.03 | 0.00 | 0.00 | 7.66 | 6.98 | 0.00 | 0.00 | 900 | 900 | −15.0 |
| 2 | 0.02 | 0.00 | 1.00 | 0.02 | 7.84 | 8.68 | 0.00 | 14.03 | 0.00 | 0.00 | 7.66 | 6.98 | 0.00 | 0.00 | 700 | 900 | −15.0 |
| 3 | 0.02 | 0.00 | 1.00 | 0.02 | 7.84 | 8.68 | 0.00 | 14.03 | 0.00 | 0.00 | 7.66 | 6.98 | 0.00 | 0.00 | 1000 | 900 | −15.0 |
| 4 | 0.02 | 0.00 | 1.00 | 0.02 | 7.84 | 8.68 | 0.00 | 14.03 | 0.00 | 0.00 | 7.66 | 6.98 | 0.00 | 0.00 | 900 | 700 | −19.5 |
| 5 | 0.02 | 0.00 | 1.00 | 0.02 | 7.84 | 8.68 | 0.00 | 14.03 | 0.00 | 0.00 | 7.66 | 6.98 | 0.00 | 0.00 | 900 | 1000 | −13.3 |
| 6 | 0.02 | 0.00 | 1.00 | 0.02 | 7.84 | 8.68 | 0.00 | 14.03 | 0.00 | 0.00 | 7.66 | 6.98 | 0.00 | 0.00 | 900 | 900 | −21.0 |
| 7 | 0.02 | 0.00 | 1.00 | 0.02 | 7.84 | 8.68 | 0.00 | 14.03 | 0.00 | 0.00 | 7.66 | 6.98 | 0.00 | 0.00 | 900 | 900 | −8.5 |
| 8* | 0.02 | 0.00 | 1.00 | 0.02 | 7.84 | 8.68 | 0.00 | 14.03 | 0.00 | 0.00 | 7.66 | 6.98 | 0.00 | 0.00 | 900 | — | — |
| 9* | 0.02 | 0.00 | 1.00 | 0.02 | 7.84 | 8.68 | 0.00 | 14.03 | 0.00 | 0.00 | 7.66 | 6.98 | 0.00 | 0.00 | 900 | 650 | −21.0 |
| 10* | 0.02 | 0.00 | 1.00 | 0.02 | 7.84 | 8.68 | 0.00 | 14.03 | 0.00 | 0.00 | 7.66 | 6.98 | 0.00 | 0.00 | 900 | 900 | −8.0 |
| 11 | 0.00 | 0.00 | 1.00 | 0.02 | 7.84 | 8.68 | 0.00 | 14.03 | 0.00 | 0.00 | 7.66 | 6.98 | 0.00 | 0.00 | 900 | 900 | −15.0 |
| 12 | 0.45 | 0.00 | 1.00 | 0.06 | 7.84 | 8.68 | 0.00 | 14.03 | 0.00 | 0.00 | 7.66 | 6.98 | 0.00 | 0.00 | 900 | 900 | −15.0 |
| 13 | 0.00 | 0.10 | 1.00 | 0.08 | 7.84 | 8.68 | 0.00 | 14.03 | 0.00 | 0.00 | 7.66 | 6.98 | 0.00 | 0.00 | 900 | 900 | −15.0 |
| 14 | 0.02 | 0.00 | 0.98 | 0.02 | 7.84 | 8.68 | 0.00 | 14.03 | 0.00 | 0.00 | 7.66 | 6.98 | 0.00 | 0.00 | 900 | 900 | −15.0 |
| 15 | 0.02 | 0.00 | 1.02 | 0.02 | 7.84 | 8.68 | 0.00 | 14.03 | 0.00 | 0.00 | 7.66 | 6.98 | 0.00 | 0.00 | 900 | 900 | −15.0 |
| 16 | 0.02 | 0.00 | 1.00 | 0.00 | 7.84 | 8.68 | 0.00 | 14.03 | 0.00 | 0.00 | 7.66 | 6.98 | 0.00 | 0.00 | 900 | 900 | −15.0 |
| 17 | 0.30 | 0.05 | 1.00 | 0.10 | 7.84 | 8.68 | 0.00 | 14.03 | 0.00 | 0.00 | 7.66 | 6.98 | 0.00 | 0.00 | 900 | 900 | −15.0 |
| 18 | 0.02 | 0.00 | 1.00 | 0.02 | 7.10 | 8.68 | 0.00 | 14.03 | 0.00 | 0.00 | 7.66 | 6.98 | 0.00 | 0.00 | 900 | 900 | −15.0 |

-continued

| Sample No. | Primary Component $(Ca_{1-a-b}Sr_aBa_b)_m(Zr_{1-c}Ti_c)O_3$ | | | | Auxiliary Component (parts by mole to 100 parts by mole of Primary Component) | | | | | | | | | | Baking Temperature (°C.) | Heat Treatment Conditions Temperature (°C.) | Oxygen Partial Pressure logPO$_2$ (MPa) |
|---|---|---|---|---|---|---|---|---|---|---|---|---|---|---|---|---|---|
| | a | b | m | c | MnO | SiO$_2$ | MgO | CaO | SrO | BaO | LiO$_{1/2}$ | BO$_{3/2}$ | AlO$_{3/2}$ | TiO$_2$ | | | |
| 19 | 0.02 | 0.00 | 1.00 | 0.02 | 3.00 | 8.68 | 0.00 | 14.03 | 0.00 | 0.00 | 7.66 | 6.98 | 0.00 | 0.00 | 900 | 900 | −15.0 |
| 20 | 0.02 | 0.00 | 1.00 | 0.02 | 12.00 | 8.68 | 0.00 | 14.03 | 0.00 | 0.00 | 7.66 | 6.98 | 0.00 | 0.00 | 900 | 900 | −15.0 |
| 21 | 0.02 | 0.00 | 1.00 | 0.02 | 7.84 | 12.06 | 0.00 | 0.00 | 0.00 | 12.24 | 4.59 | 12.24 | 0.00 | 0.00 | 900 | 900 | −15.0 |
| 22 | 0.02 | 0.00 | 1.00 | 0.02 | 7.84 | 14.30 | 0.55 | 1.22 | 1.88 | 8.88 | 4.98 | 12.08 | 1.35 | 0.00 | 900 | 900 | −15.0 |
| 23 | 0.02 | 0.00 | 1.00 | 0.02 | 7.84 | 4.61 | 0.04 | 0.08 | 0.13 | 0.59 | 0.33 | 0.81 | 0.09 | 0.00 | 900 | 900 | −15.0 |
| 24 | 0.02 | 0.00 | 1.00 | 0.02 | 7.84 | 25.86 | 0.00 | 2.65 | 2.63 | 3.51 | 26.20 | 12.20 | 1.10 | 1.68 | 900 | 900 | −15.0 |
| 25 | 0.02 | 0.00 | 1.00 | 0.02 | 7.84 | 0.69 | 0.00 | 0.08 | 0.13 | 0.59 | 0.33 | 0.81 | 0.09 | 0.11 | 900 | 900 | −15.0 |
| 26 | 0.02 | 0.00 | 1.00 | 0.02 | 7.84 | 13.44 | 0.00 | 28.05 | 0.00 | 0.00 | 15.31 | 13.97 | 0.00 | 0.00 | 900 | 900 | −15.0 |

*indicates the outside of the present invention.

Next, cross-sections of the multilayer ceramic capacitors of sample Nos. 1 to 26 were observed using an FE-SEM (field-emission scanning electron microscope) at a magnification of 1,000 times so as to obtain the area ratio of the secondary phase particles in a visual field of 10 μm square, and it was confirmed that the area ratio was 0.1% or more. The discrimination between the primary phase particles and the secondary phase particles was performed based on a mapping analysis using an FE-WDX (field-emission wavelength-dispersive X-ray spectroscope).

Subsequently, a mapping analysis was performed for the polished surfaces using a WDX (wavelength-dispersive X-ray spectroscope) after the multilayer ceramic capacitors of sample Nos. 1 to 26 were polished so as to expose the internal electrodes, and the long sides and the short sides of the secondary phase particles were measured, so that an average value (average particle diameter) was obtained. Then, of secondary phase particles having a particle diameter of about 0.1 μm or more, the number of particles containing Si was counted, so that the ratio thereof was calculated.

Since the Cu to be formed into the internal electrodes partly diffuses to the ceramic layer side during the firing treatment of the ceramic laminate, Cu is inevitably contained in the secondary phase particles, and hence when the number of particles containing Si of the secondary phase particles is counted, the minimum number of particles containing Cu and Si of the secondary phase particles can be obtained.

Next, the electrostatic capacitance C and the Q values were measured using an automatic bridge-type measurement apparatus at a frequency of 1 MHz, an effective AC voltage of 1 Vrms, and a temperature of 25° C., and the relative dielectric constant ∈r was calculated from the electrostatic capacitance C and the sample dimensions.

In addition, using the following equation (1), a temperature coefficient α of electrostatic capacitance (hereinafter referred to as a "capacitance change rate") at −55° C. and that at +125° C. were calculated.

$$\alpha = \frac{C_i - C_{20}}{C_{20}(T_i - 20)} \times 10^{-6} \qquad (1)$$

In this equation, Ti indicates a measurement temperature (−55° C. or +125° C.), $C_i$ indicates the electrostatic capacitance (F) at the measurement temperature Ti, and $C_{20}$ indicates the electrostatic capacitance (F) at a temperature of 20° C.

Next, a high-temperature load test was performed on 72 test pieces of each of sample Nos. 1 to 26, so that the high-temperature load lifetime could be evaluated. First, an initial insulating resistance (log IR$_0$) of each test piece was measured at an application voltage of 25 V, an application time of 120 seconds, and a temperature of 25° C. using an insulation resistance tester. Subsequently, after the high-temperature load test was performed, the insulating resistance (log IR) was again measured, and the average order of magnitude of degradation in insulating resistance IR (average order of magnitude of IR degradation) was calculated, to evaluate the high-temperature load lifetime.

The high-temperature load test was performed at an application voltage of 100 V and at a temperature of 150° C. for 250 hours.

The following shows the individual measurement results.

| Sample No. | Number of Particle Containing Si of Secondary Phase Particles Having Size of 0.1 μm or more (%) | Relative Dielectric Constant ∈r | Q Value (—) | Capacitance Change Rate α (ppm/° C.) | | Average Order of Magnitude of IR Degradation |
|---|---|---|---|---|---|---|
| | | | | −55° C. | +125° C. | |
| 1 | 89 | 26 | >10000 | 2 | 21 | 1.5 |
| 2 | 91 | 26 | >10000 | 2 | 24 | 1.3 |
| 3 | 83 | 26 | >10000 | 7 | 29 | 2 |
| 4 | 67 | 26 | >10000 | 5 | 27 | 3 |
| 5 | 92 | 26 | >10000 | 0 | 15 | 1.2 |

-continued

| Sample No. | Number of Particle Containing Si of Secondary Phase Particles Having Size of 0.1 μm or more (%) | Relative Dielectric Constant ∈r | Q Value (—) | Capacitance Change Rate α (ppm/° C.) −55° C. | Capacitance Change Rate α (ppm/° C.) +125° C. | Average Order of Magnitude of IR Degradation |
|---|---|---|---|---|---|---|
| 6 | 100 | 26 | >10000 | −3 | 10 | 0.5 |
| 7 | 72 | 26 | >10000 | 3 | 22 | 3 |
| 8* | 60 | 26 | 500 | 10 | 37 | 6 |
| 9* | 65 | 26 | 2000 | 8 | 32 | 6 |
| 10* | 63 | 26 | 1000 | 8 | 33 | 6 |
| 11 | 89 | 26 | >10000 | 7 | 29 | 1.5 |
| 12 | 86 | 28 | >10000 | 3 | 20 | 1.8 |
| 13 | 84 | 32 | >10000 | 7 | 29 | 2 |
| 14 | 90 | 26 | >10000 | 5 | 27 | 1.4 |
| 15 | 69 | 26 | >10000 | 5 | 28 | 3 |
| 16 | 89 | 26 | >10000 | 5 | 27 | 1.5 |
| 17 | 82 | 33 | >10000 | 9 | 29 | 2 |
| 18 | 90 | 26 | >10000 | 5 | 24 | 1.5 |
| 19 | 95 | 27 | >10000 | −1 | 16 | 1 |
| 20 | 75 | 25 | >10000 | 7 | 29 | 2.8 |
| 21 | 89 | 22 | >10000 | 9 | 30 | 1.5 |
| 22 | 89 | 22 | >10000 | 8 | 30 | 1.5 |
| 23 | 80 | 30 | >10000 | 2 | 22 | 2.3 |
| 24 | 86 | 21 | >10000 | 9 | 30 | 1.8 |
| 25 | 77 | 30 | >10000 | 3 | 22 | 2.5 |
| 26 | 91 | 21 | >10000 | 3 | 24 | 1.5 |

*indicates the outside of the present invention.

As obvious from above Tables and the results of sample No. 8, it was found that the percentage of the number of particles containing Si of secondary phase particles having a size of about 0.1 m or more is low, such as 60%, so that the Q value is low, such as 500; the capacitance change rate α is 37 ppm/° C. at +125° C., so that the CG characteristic is not satisfied; and the average order of magnitude of IR degradation is large, such as 6, so that the high-temperature load lifetime is inferior. The reason for this is believed that since the heat treatment is not performed after the formation of the external electrodes, even when $SiO_2$ is added as the auxiliary component, Mn—Cu—O cannot be absorbed in a Si-containing phase.

The results of sample No. 9 show that the percentage of the number of particles containing Si of the secondary phase particles having a size of about 0.1 μm or more is low, such as 65%, the Q value is low, such as 2,000, although being slightly higher than that of sample No. 8; and the average order of magnitude of IR degradation is large, such as 6, so that the high-temperature load lifetime is inferior. The reason for this is believed that since the heat treatment after the formation of the external electrodes is performed at a low temperature, such as 650° C., a compound made from Mn—Cu—O cannot be sufficiently absorbed in a Si-containing phase.

It was found from the results of sample No. 10, that the percentage of the number of particles containing Si of the secondary phase particles having a size of about 0.1 μm or more was low, such as 63%, so that the Q value is low, such as 1,000; and the average order of magnitude of IR degradation is large, such as 6, so that the high-temperature load lifetime is inferior. The reason for this is believed that since the heat treatment after the formation of the external electrodes is performed at an oxygen partial pressure of $10^{-8.0}$ MPa, a reducing atmosphere in which predetermined function and advantage are obtained cannot be realized and that hence, a compound made from Mn—Cu—O cannot be sufficiently absorbed in a Si-containing phase.

On the other hand, when the heat treatment after the formation of the external electrodes was performed at a temperature of about 700 to 1,000° C. and at an oxygen partial pressure of about $10^{-8.5}$ to $10^{-21.0}$ MPa, the percentage of the number of particles containing Si of the secondary phase particles having a size of about 0.1 μm or more was 67% or more according to the results of sample Nos. 1 to 7, and 11 to 26, and hence Mn—Cu—O can be sufficiently absorbed in a Si-containing phase. Accordingly, a multilayer ceramic capacitor could be obtained in which a high Q value of 10,000 or more was realized, the capacitance change rate a satisfied the CG characteristic, and the average order of magnitude of IR degradation could be suppressed to 3 or less.

In addition, it was understood that of the secondary phase particles having a size of about 0.1 μm or more, when the percentage of the number of particles containing Si is about 85% or more (sample Nos. 1, 2, 5, 6, 11, 12, 14, 16, 18, 19, 21, 22, 24, and 26), the average order of magnitude of IR degradation can be suppressed to 1.8 or less, and the degradation in high-temperature load lifetime can be more effectively suppressed. In particular, it was understood that as shown by the results of sample No. 6, when the heat treatment is performed at an oxygen partial pressure of $10^{-21.0}$ MPa in accordance with a firing profile in which the maximum temperature is set to 900° C., all secondary phase particles having a size of 0.1 μm or more contain Si and that hence, the average order of magnitude of IR degradation can be suppressed to 0.5.

The invention claimed is:
1. A multilayer ceramic capacitor comprising: a ceramic base body comprising primary phase particles comprising a CaZrO3-based compound as a primary component and secondary phase particles containing at least Mn; internal electrodes primarily composed of Cu embedded in the ceramic base body; and a pair of external electrodes at external portions of the ceramic base body each of which is electrically connected to a different internal electrode, wherein the ceramic base body contains about 2 parts by mole or more of Mn and about 0.69 parts by mole or more of Si relative to 100 parts by mole of the primary component, and the area ratio of the secondary phase particles on a cross-section of the ceramic base body is about 0.1% or more, and wherein secondary phase particles comprise particles having a particle diameter of at least about 0.1 μm and about 67% or more of the secondary phase particles having a particle diameter of about 0.1 μm or more contain Cu and Si.

2. The multilayer ceramic capacitor according to claim 1, wherein about 85% or more of the secondary phase particles having a particle diameter of about 0.1 μm or more contain Cu and Si.

3. The multilayer ceramic capacitor according to claim 2, wherein in the $CaZrO_3$-based compound, Ca is partly replaced with at least one of Sr and Ba, and Zr is partly replaced with Ti.

4. The multilayer ceramic capacitor according to claim 2, wherein the $CaZrO_3$-based compound is a composite oxide represented by a general formula:

$(Ca_{1-a-b}Sr_aBa_b)_m(Zr_{1-c}Ti_c)O_3$ in which $0 \leq a \leq 0.45$, $0 \leq b \leq 0.10$, $0 \leq c \leq 0.10$, and $0.98 \leq m \leq 1.02$.

5. The multilayer ceramic capacitor according to claim 4, wherein the ceramic base body contains at least one member selected from the group consisting of Mg, Ca, Sr, Ba, Li, B, Al and Ti.

6. The multilayer ceramic capacitor according to claim 1, wherein the $CaZrO_3$-based compound is a composite oxide represented by a general formula:

$(Ca_{1-a-b}Sr_aBa_b)_m(Zr_{1-c}Ti_c)O_3$ in which $0 \leq a \leq 0.45$, $0 \leq b \leq 0.10$, $0 \leq c \leq 0.10$, and $0.98 \leq m \leq 1.02$.

7. The multilayer ceramic capacitor according to claim 6, wherein the ceramic base body contains at least one member selected from the group consisting of Mg, Ca, Sr, Ba, Li, B, Al and Ti.

8. The multilayer ceramic capacitor according to claim 7, wherein the external electrodes comprise at least one of copper and nickel.

9. The multilayer ceramic capacitor according to claim 1, wherein the external electrodes comprise a base metal.

10. The multilayer ceramic capacitor according to claim 9, wherein the external electrodes comprise at least one of copper and nickel.

11. A method for manufacturing a multilayer ceramic capacitor, comprising providing a laminate comprising a ceramic base body having at least two internal electrodes primarily composed of copper embedding therein and electrically isolated from one another, and a pair of external electrode conductive pastes disposed on separated external portions of the ceramic base body so as to be in electrical contact with different internal electrodes, wherein the ceramic base body comprises primary phase particles comprising a $CaZrO_3$-based compound as a primary component and secondary phase particles containing at least Mn and wherein secondary phase particles have a particle diameter of at least about 0.1 μm of which about 67% or more of the secondary phase particles having a particle diameter of about 0.1 μm or more contain Cu and Si, and wherein the ceramic base body contains about 2 parts by mole or more of Mn and about 0.69 parts by mole or more of Si relative to 100 parts by mole of the primary component, and an area ratio of the secondary phase particles on a cross-section of the ceramic base body is about 0.1% or more, and subjecting the laminate to a heat treatment at a temperature of about 700° C. or more in a reducing atmosphere at an oxygen partial pressure of about $10^{-8.5}$ MPa or less.

12. A method for manufacturing a multilayer ceramic capacitor according to claim 11, further comprising the steps of:

adding a compound as an auxiliary component which contains at least Mn and Si to a primary component of a $CaZrO_3$-based compound so that the amounts of Mn and Si are about 2 parts by mole or more and about 0.69 parts by mole or more, respectively, relative to 100 parts by mole of the primary component to form ceramic green sheets; applying an internal-electrode conductive paste primarily composed of Cu to surfaces of the ceramic green sheets to form conductive patterns; laminating a plurality of the ceramic green sheets provided with the conductive patterns to form a ceramic laminate in which at least two of the conductive patterns are electrically isolated from one another; applying an external-electrode conductive paste to two separated surface portions of the laminate, baking the laminate; and then performing said heat treatment at a temperature of about 700° C. or more in a reducing atmosphere at an oxygen partial pressure of about $10^{-8.5}$ MPa or less.

13. A method for manufacturing a multilayer ceramic capacitor according to claim 11, wherein the ceramic laminate is subjected to firing to form a ceramic base body before applying the external electrode conductive paste.

14. A method for manufacturing a multilayer ceramic capacitor according to claim 11, wherein the $CaZrO_3$-based compound is a composite oxide represented by a general formula:

$(Ca_{1-a-b}Sr_aBa_b)_m(Zr_{1-c}Ti_c)O_3$ in which $0 \leq a \leq 0.45$, $0 \leq b \leq 0.10$, $0 \leq c \leq 0.10$, and $0.98 \leq m \leq 1.02$.

15. A method for manufacturing a multilayer ceramic capacitor according to claim 14, wherein the ceramic base body contains at least one member selected from the group consisting of Mg, Ca, Sr, Ba, Li, B, Al and Ti.

16. A method for manufacturing a multilayer ceramic capacitor according to claim 14, wherein about 85% or more of the secondary phase particles having a particle diameter of about 0.1 μm or more contain Cu and Si, and wherein the laminate is subjected to the heat treatment at about 700 to 1000° C. in a reducing atmosphere at an oxygen partial pressure of at least about $10^{-21}$ MPa.

17. A method for manufacturing a multilayer ceramic capacitor according to claim 11, wherein the laminate is subjected to the heat treatment in a reducing atmosphere at an oxygen partial pressure of at least about $10^{-21}$ MPa.

18. A method for manufacturing a multilayer ceramic capacitor according to claim 11, wherein about 85% or more of the secondary phase particles having a particle diameter of about 0.1 μm or more contain Cu and Si.

19. A method for manufacturing a multilayer ceramic capacitor according to claim 14, wherein the laminate is subjected to the heat treatment at about 700 to 1000° C. in a reducing atmosphere at an oxygen partial pressure of at least about $10^{-21}$ MPa.

* * * * *